United States Patent
Jeswani et al.

(10) Patent No.: US 8,880,638 B2
(45) Date of Patent: Nov. 4, 2014

(54) DISTRIBUTED IMAGE CACHE FOR SERVICING VIRTUAL RESOURCE REQUESTS IN THE CLOUD

(75) Inventors: Deepak K. Jeswani, New Delhi (IN); Pradipta De, New Delhi (IN); Manish Gupta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 13/525,497

(22) Filed: Jun. 18, 2012

(65) Prior Publication Data

US 2013/0339470 A1 Dec. 19, 2013

(51) Int. Cl.
G06F 15/167 (2006.01)

(52) U.S. Cl.
USPC ........................................................ 709/214

(58) Field of Classification Search
CPC .................................................... H04L 67/2842
USPC .......................... 709/213–214, 217–219, 223
See application file for complete search history.

(56) References Cited

U.S. PATENT DOCUMENTS

| | | | | |
|---|---|---|---|---|
| 8,151,062 B2 * | 4/2012 | Krishnaprasad et al. | ..... | 711/143 |
| 8,473,587 B1 * | 6/2013 | Lappas et al. | ................. | 709/220 |
| 8,578,076 B2 * | 11/2013 | van der Linden et al. | ...... | 710/72 |
| 2003/0140107 A1 | 7/2003 | Rezvani et al. | | |
| 2007/0234302 A1 | 10/2007 | Suzuki et al. | | |
| 2008/0295064 A1 | 11/2008 | Mitra et al. | | |
| 2009/0063652 A1 * | 3/2009 | Hwang et al. | ................. | 709/213 |
| 2009/0198790 A1 | 8/2009 | Grevers, Jr. | | |
| 2009/0282404 A1 | 11/2009 | Khandekar et al. | | |
| 2009/0300076 A1 | 12/2009 | Friedman et al. | | |
| 2009/0313438 A1 | 12/2009 | Khrishnaprasad et al. | | |
| 2009/0319473 A1 * | 12/2009 | Rao et al. | .......................... | 707/2 |
| 2010/0042720 A1 | 2/2010 | Stienhans et al. | | |
| 2010/0223610 A1 | 9/2010 | DeHaan et al. | | |
| 2010/0235482 A1 | 9/2010 | Chalupa et al. | | |
| 2011/0022812 A1 | 1/2011 | van der Linden et al. | | |
| 2011/0078681 A1 | 3/2011 | Li et al. | | |
| 2011/0145189 A1 | 6/2011 | Zheng et al. | | |

(Continued)

FOREIGN PATENT DOCUMENTS

GB 2476878 7/2011
WO WO2012000879 1/2012

OTHER PUBLICATIONS

U.S. Appl. No. 61/514,253, filed Aug. 2011, Jadhav, Ajay.*

(Continued)

Primary Examiner — Lance L Barry
(74) Attorney, Agent, or Firm — Ference & Associates LLC

(57) ABSTRACT

A method of provisioning in a cloud compute environment having a set of cloud hosts associated with one another. The method begins by forming a distributed, cooperative cache across the set of cloud hosts by declaring a portion of a data store associated with a cloud host as a cache, and storing template images and patches in the cache. Caching activity across the distributed, cooperated cache is coordinated by having the caches share information about their respective contents. A control routine at a cache receives requests for template images or patches, responds to the requests if the requested artifacts are available or, upon a cache miss, forwards the request to another one of the caches. Periodically, the composition of the distributed, cooperative cache is computed, and the template images and patches are populated into the caches using the computed cache composition.

18 Claims, 9 Drawing Sheets

(56) References Cited

U.S. PATENT DOCUMENTS

| | | | |
|---|---|---|---|
| 2011/0173405 A1 | 7/2011 | Grabarnik et al. | |
| 2011/0185292 A1 | 7/2011 | Chawla et al. | |
| 2011/0320733 A1* | 12/2011 | Sanford et al. | 711/135 |
| 2012/0041970 A1* | 2/2012 | Ghosh et al. | 707/769 |
| 2012/0096457 A1 | 4/2012 | Gupta et al. | |
| 2012/0151476 A1 | 6/2012 | Vincent | |
| 2012/0198451 A1 | 8/2012 | Gupta et al. | |
| 2012/0240110 A1* | 9/2012 | Breitgand et al. | 718/1 |
| 2013/0097680 A1* | 4/2013 | Bendapudi et al. | 726/6 |
| 2013/0110961 A1* | 5/2013 | Jadhav | 709/213 |
| 2013/0117240 A1* | 5/2013 | Taylor et al. | 707/690 |
| 2013/0132954 A1* | 5/2013 | Bolte et al. | 718/1 |
| 2013/0198743 A1 | 8/2013 | Kruglick | |

OTHER PUBLICATIONS

Chen, Yang, et al., "An Efficient Resource Management System for On-line Virtual Cluster Provision", Sep. 21-25, 2009 IEEE International Conference on Cloud Computing, 8 pages, IEEE, Bangalore, India.

Ruth, Paul, et. al., "VioCluster: Virtualization for Dynamic Computational Domains", available online at http://www.cs.purdue.edu/homes/dxu/pubs/Cluster2005.pdf as of Oct. 30, 2013. 10 pages.

Tanenbaum, Andrew S., Modern Operating System, 3rd Edition, Pearson Prentice Hall, 2008, 10 pages, London, England.

Shi, Lei et al., "Iceberg: An Image Streamer for Space and Time Efficient Provisioning of Virtual Machines," International Conference on Parallel Processing-Workshops, 2008, ICPP-W '08, International Conference, Sep. 2008, pp. 31-38, IEEE Computer Society, Washington, DC, USA.

Epstein, Amir et al., "Virtual Appliance Content Distribution for a Global Infrastructure Cloud Service," IEEE INFOCOM 2010 Proceedings, Technical Program, Mar. 15-19, 2010, 9 pages, IEEE Digital Library.

Borst et al, "Distributed Caching Algorithms for Content Distribution Networks," IEEE INFOCOM 2010.

Emeneker, et al, "Efficient Virtual Machine Caching in Dynamic Virtual Clusters," ICAPDS 2007.

"Method and System for Fast Virtual Image Provisioning in Cloud Environment," Disclosure No. IPCOM000210398D dated Sep. 2, 2011.

Chen, Zhijia et al., "Rapid Provisioning of Cloud Infrastructure Leveraging Peer-to-Peer Networks," 2009 29th IEEE International Conference on Distributed Computing Systems Workshops, Montreal, Quebec, Canada, Jun. 22-26, 2009, pp. 324-329, IEEE Digital Library.

"Method and System for Faster Deployment of Virtual Machine (VM) Images," Disclosure No. IPCOM000199680D dated Sep. 14, 2010.

\* cited by examiner

| NOTATION | ARITY | EXPLANATION |
| --- | --- | --- |
| $I_i$ | $i \in \{1 \ldots N\}$ | DENOTES THE $i_{th}$ IMAGE TEMPLATE |
| $size_{ij}$ | $i \in \{1 \ldots N\}$, $j \in \{1 \ldots N\}$ | DENOTES THE SIZE OF THE PATCH TO CONSTRUCT $I_j$ FROM $I_i$ |
| $size_i$ | $i \in \{1 \ldots N\}$ | DENOTES THE SIZE OF THE TEMPLATE $I_i$ |
| $H_k$ | $k \in \{1 \ldots K\}$ | DENOTES $k_{th}$ HOST IN THE CLOUD HOSTING CENTER |
| $C_k$ | $k \in \{1 \ldots K\}$ | DENOTES SPACE AVAILABLE FOR CACHING ON $k_{th}$ HOST |
| $f_{jr}$ | $j \in \{1 \ldots N\}$, $r \in \{1 \ldots K\}$ | THE REQUEST ARRIVAL RATE FOR TEMPLATE $I_j$ AT NODE $H_r$ |
| $S_{ijpqr}$ | $i \in \{1 \ldots N\}$, $j \in \{1 \ldots N\}$, $p \in \{1 \ldots K\}$, $q \in \{1 \ldots K\}$, $r \in \{1 \ldots K\}$ | THIS IS A DECISION VARIABLE, WHICH WHEN SET TO 1 IMPLIES THAT $I_j@H_r := I_i@H_q \otimes Patch_{ij}@H_p$ |

*FIG. 10*

Require: Init Request-Arrival-Frequency-Table from history
Require: Init CostMatrix ($\gamma$)
Require: Init Template and Patch sizes,
Require: Init Per-Node-Cache-Space (CS)
Require: Init SolutionLookUpTable(SLT) /* *a hashtable that returns how to generate requested template at a node* */

1: procedure *DiffCache*
2:  COST := cost of serving all requests from repository
3:  spaceAvailable = true
4:  while spaceAvailable == true do
5:   /* *PickImageAndPatches returns updated data structures* */
6:   *PickImageAndPatches*
7:   if new template or patch added then
8:    /* *update COST, CS and SLT based on the return values* */
9:    UpdateDataStructures /* *Global Data Structures are updated* */
10:   end if
11:  end while

FROM FIG. 11A

```
12: procedure PickImageAndPatches
13:   benefit = 0
14:   for all Template i do
15:     for all Node k do
16:       if (I_i @H_k == false) && (CacheSpace on H_k ≥ size_i) then
17:         newBenefit = PickPatches(i,k)
18:         if (newBenefit > benefit) then
19:           UpdateDataStructures /* Update Local Data Structures */
20:         end if
21:       end if
22:     end for
23:   end for
24:   return LocallyUpdatedDataStructures /* PickPatches determines which patches to pick, given that I_i on H_k */
25: procedure PickPatches(inti,intk)
26:   newCost = total cost after placing I_i on H_k
27:   adjust space on H_k due to I_i
28:   adjust RefCnt for I_i @H_k
29:   store new lookupEntry for I_i @H_k
30:   for all Nodes q, q ≠ 0, q ≠ k do
31:     for all Templates j, j ≠ i do
32:       bestCostReduction = 0
33:       for all Nodes r = 0 → K do
34:         /* the costs are looked up from the costMatrix */
35:         costReduction = newCost - oldCost;
36:         if (costReduction > bestCostReduction) then
37:           newSol = save current patch placement
38:         end if
39:       end for
40:       if (newSol is not empty) then
41:         UpdateDataStructures /* Update Local Data Structures */
42:       end if
43:     end for
44:   end for
45:   return LocallyUpdatedDataStructures
```

*FIG. 11B*

DISTRIBUTED IMAGE CACHE FOR SERVICING VIRTUAL RESOURCE REQUESTS IN THE CLOUD

CROSS-REFERENCE TO RELATED APPLICATION

This application is related to Ser. No. 13/362,870, filed Jan. 31, 2012, titled "Computing reusable image components to minimize network bandwidth usage,".

This application includes subject matter that is protected by copyright. All rights are reserved.

BACKGROUND OF THE INVENTION

1. Technical Field

This disclosure relates generally to planning and deploying of resource-consuming virtual entities, e.g., virtual machines, in computing environments, e.g., a data center or a "cloud" of distributed computing resources.

2. Background of the Related Art

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP. An example application might be one that provides a common set of messaging functions, such as email, calendaring, contact management, and instant messaging. A user would then access the service directly over the Internet. Using this service, an enterprise would place its email, calendar and/or collaboration infrastructure in the cloud, and an end user would use an appropriate client to access his or her email, or perform a calendar operation.

Cloud compute resources are typically housed in large server farms that run networked applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

In a Software-as-a-Service (SaaS) cloud delivery model, a hosting center deploys a VM image template on a server on demand. Image templates typically are maintained in a central repository. A Virtual Appliance (VA) is a virtual machine image file comprising a pre-configured operating system environment, along with application(s) installed, configured and tested in the environment. The use of VA as a basic unit of deployment in the cloud introduces a new challenge for cloud service providers. VA image files are large, often tens of GigaBytes (GB) in size. When a request for a VA template is received, the entire file must be transferred to the hosting physical server for instantiation. Hosting centers, however, typically are geographically dispersed while the image repository may be centralized. The majority of time necessary to provision a request for a VM in the cloud thus is spent in delivering an image from an image repository, typically due to bandwidth-limited connectivity between sites (and the large size of the file). Therefore, accessing a repository over the Internet to fetch a GB-sized file can degrade server provisioning speed significantly.

BRIEF SUMMARY

This disclosure describes a method of provisioning in a cloud compute environment having a set of cloud hosts associated with one another, typically in a cloud delivery location. According to the method, a distributed, cooperative cache is formed across the set of cloud hosts by declaring a portion of a data store associated with a cloud host as a cache, and storing template images and patches in the cache. Caching activity across the distributed, cooperated cache is coordinated, preferably by a control routine (a "cache keeper") executing in association with a particular one of the caches, by having the caches share information about their respective contents. The control routine receives requests for template images or patches, responds to the requests if the requested artifacts are available in the associated cache or, upon a cache miss (at the receiving cache), selectively forwards the request to another one of the caches. In this manner, attempts to service requests to provision virtual resources are made from information stored in the distributed, cooperative cache if at all possible, rather than using resources (templates and/or patches) external to the environment. Periodically, the composition of the distributed, cooperative cache is computed, and the template images and patches are populated into the caches using the computed cache composition. In a preferred embodiment, the template images and patches are populated in the caches according to a cost function that minimizes a total cost of responding to service requests.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 10 illustrates a Table showing different notations used in the linear problem formulation for determining a cost function that is used to populate the distributed cache according to a preferred embodiment; and FIG. 11A-11B illustrates a representative differential template caching algorithm to compute a cache composition comprising templates and patches to be maintained at each node.

DETAILED DESCRIPTION OF AN ILLUSTRATIVE EMBODIMENT

Figure 1:
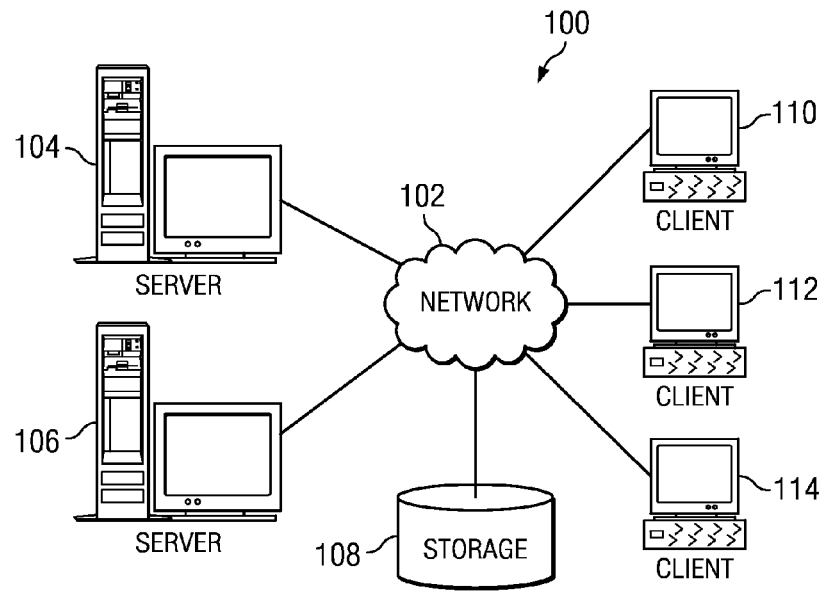
FIG. 1 depicts an exemplary block diagram of a distributed data processing environment in which exemplary aspects of the illustrative embodiments may be implemented.
Figure 2:
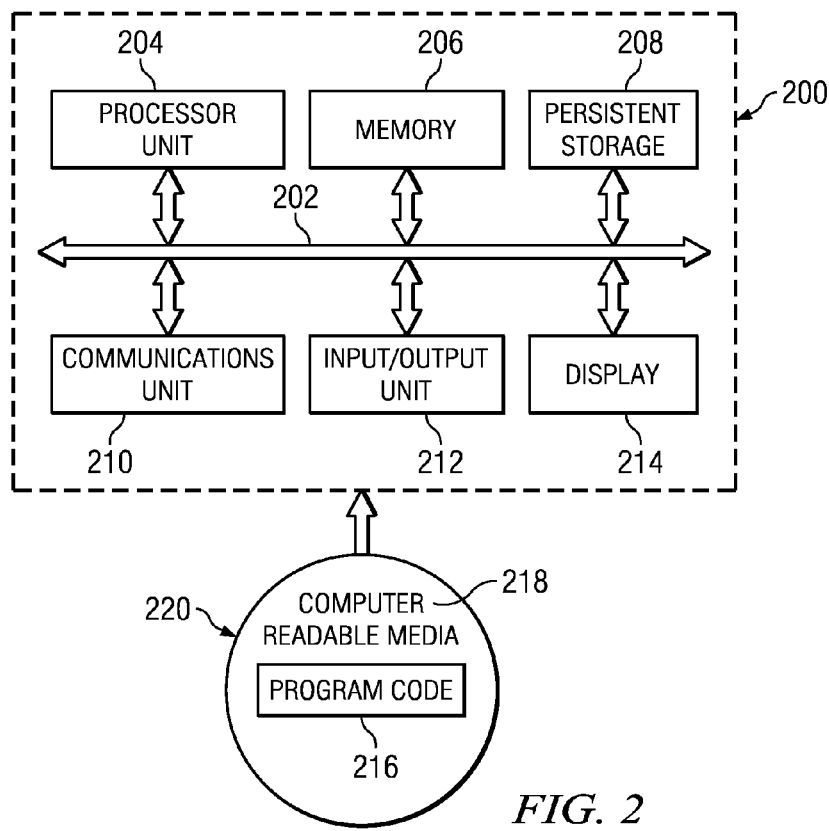
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
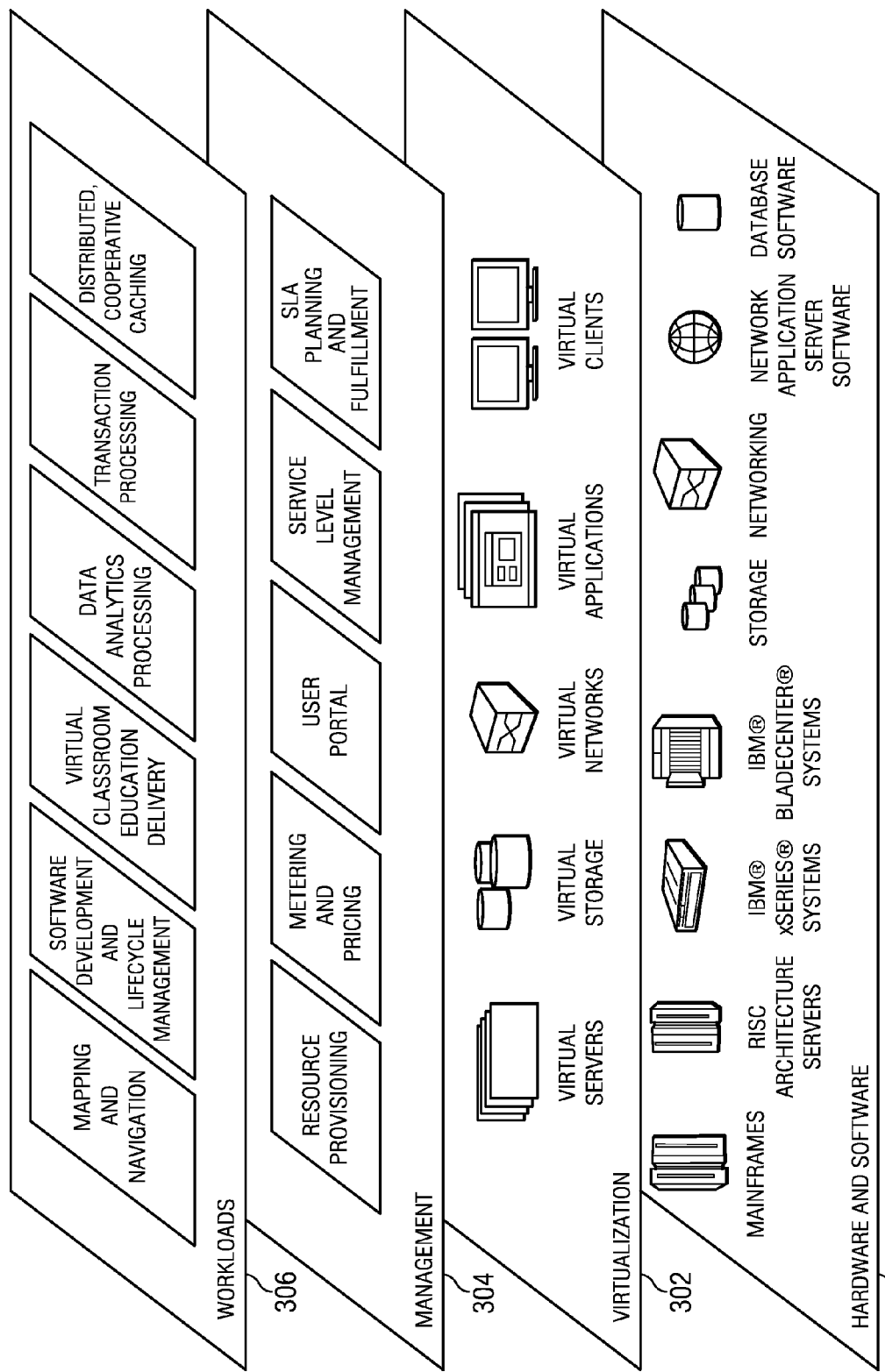
FIG. 3 illustrates an exemplary cloud computing architecture in which the disclosed subject matter may be implemented.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and differential template caching (according to this disclosure).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Image Templates

Figure 4:
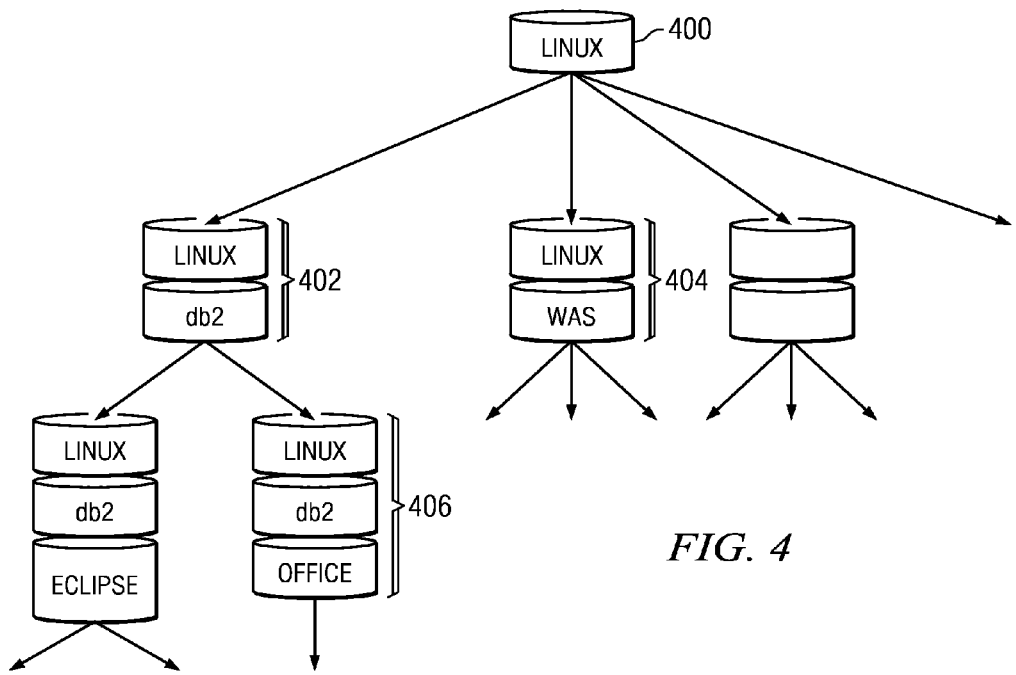
FIG. 4 illustrates how image templates typically evolve in a cloud environment.

By way of additional background, it is known that in a SaaS-based cloud delivery model, a hosting center deploys a VM image template on a server on demand. Image templates are usually maintained in a central repository. It is also known that image templates often have a high degree of commonality. As will be described below, the technique of this disclosure exploits the presence of this commonality among template files in a unique manner to minimize latency in responding to requests to provision virtual appliances in a cloud service environment. In particular, the technique takes advantage of the important observation that, while the number of image templates may be quite high (and may be expected to grow exponentially over time), typically there are only a few original base templates from which the actual end user templates are then evolved. Thus, in the usual case, a user picks an image template from a catalogue. For example, assume the user (who also may be the provider itself) selects a template with a specific Linux version, installs additional software components in it, customizes it for a group, and saves it in the repository for either public or private use. As shown in FIG. 4, each group can be visualized as a tree starting with a base template and having successive levels refining the level above along different directions, thus leading (potentially at any particular level) to a small change in the parent machine image file. In this example, a Linux template 400 is a base template upon which are installed two (2) applications, namely, DB2® and WebSphere® Application Server (WAS). This generates two new image templates 402 and 404. At a next successive layer, template 402 is modified further to create another new image template 406 by installing other applications, such as Microsoft® Office®. Of course, these applications are merely exemplary. While the original base templates are often quite large (e.g., GigaBytes (GB) in size), the programs added at each layer and used to create the new image templates (especially at each successive layer down the tree) are much smaller (e.g., most MegaBytes (MB) in size). Further, as the depth of the tree increases, the difference in size between image templates tends to decrease.

Minimizing Latency in Serving Requests Through Differential Template Caching in a Cloud According to this disclosure, instead of caching each of the image templates (which may be prohibitive in terms of storage), the technique of this disclosure implements a caching framework that takes advantage of the high degree of commonality across image templates as well as the relatively small size (as compared to the base template) of the one or more applications that may be added to create a particular VA. According to this disclosure, difference files (or "patches") are generated between two image templates. As used herein, a difference file or patch is applied on a template (which may be a base template) to generate a new template, sometimes referred to as a target image template. Rather than caching large templates, the framework herein caches patches and templates, and the patches are used as necessary (at request time) to generate a target image template.

Figure 5:
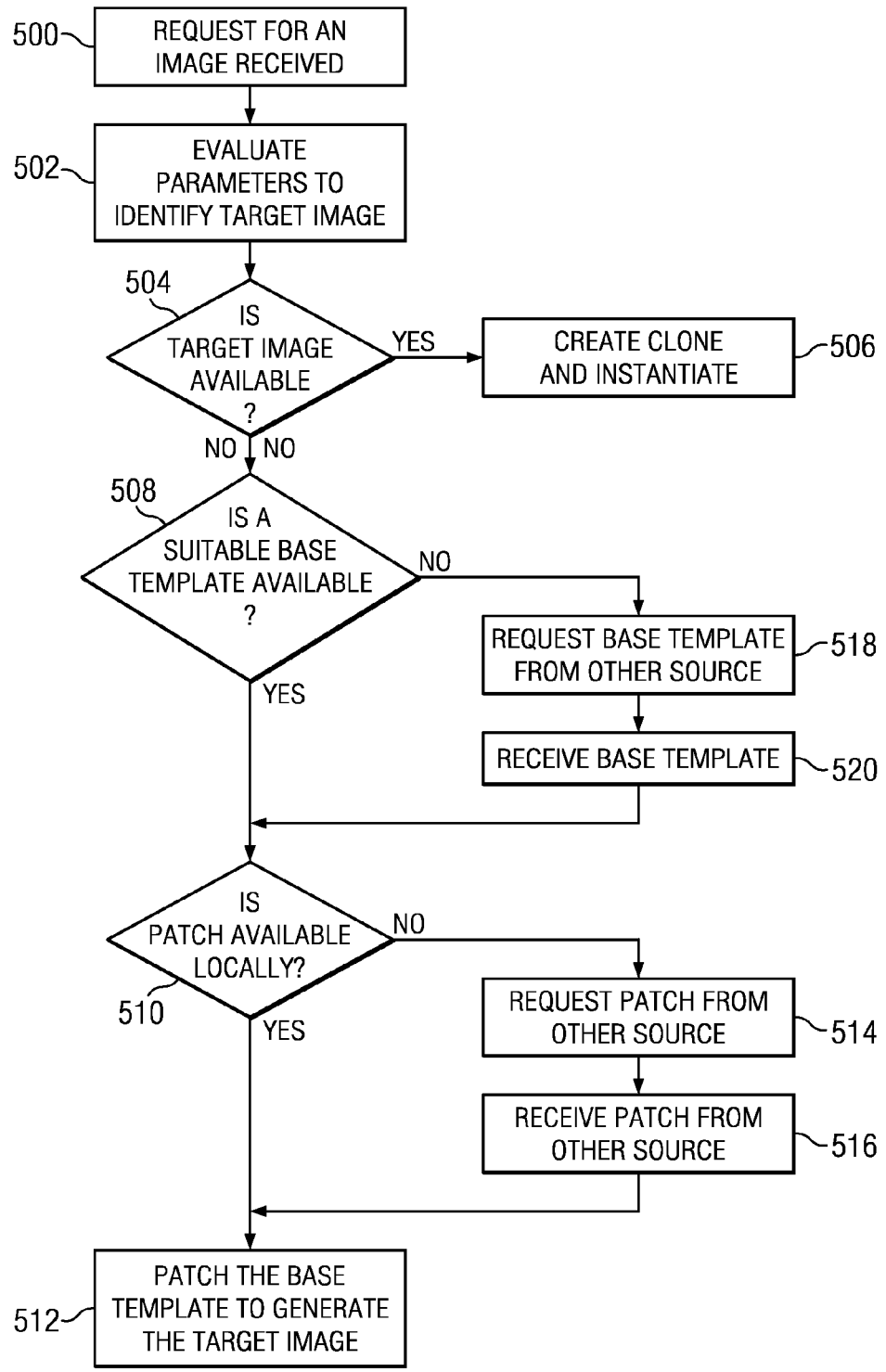
FIG. 5 illustrates a process flow for handling VA service requests at a cloud delivery location using patch-based caching according to this disclosure.

FIG. 5 is a VA request processing flow that illustrates the basic operating paradigm of this disclosure. In this process flow, it is assumed that a hosting center (or more generally, a cloud delivery location) operates a cloud compute infrastructure and deploys VM image templates on demand. At step 500, a request for an image has been received. At step 502, the request parameters are evaluated to determine the image requested. At step 504, a search is performed (typically locally) to identify if the requested image template is available. If so, the process branches to step 506 to create a clone from the image template and to instantiate it on one or more local cloud hosts in response to the request. In this latter scenario, this completes the processing of the request. If, however, the image template is not available, the routine continues at step 508 to determine whether a base template from which the target image template may be derived is available in the local cache. If the outcome of the test at step 508 is positive, the routine continues at step 510 to determine whether a patch also is available locally. If the patch is available, the routine branches to step 512, wherein the base template is patched to generate the requested (target) image. If, however, the patch is not available locally, the routine continues at step 514 to request the patch from another source. Typically, the patch is requested from a peer cache or, failing that, a nearby cache, a parent cache (if the caches are organized hierarchically), or an origin. At step 516, the patch is received from the external source and processing returns to step 512. A negative outcome of the test at step 508 means that the base template also is not available locally. In such event, the routine continues at step 518 to request the base template from another source, e.g., a peer cache, a nearby cache, a parent cache, or the like. Upon receiving the base template at step 520, control returns back to step 510.

Figure 6:
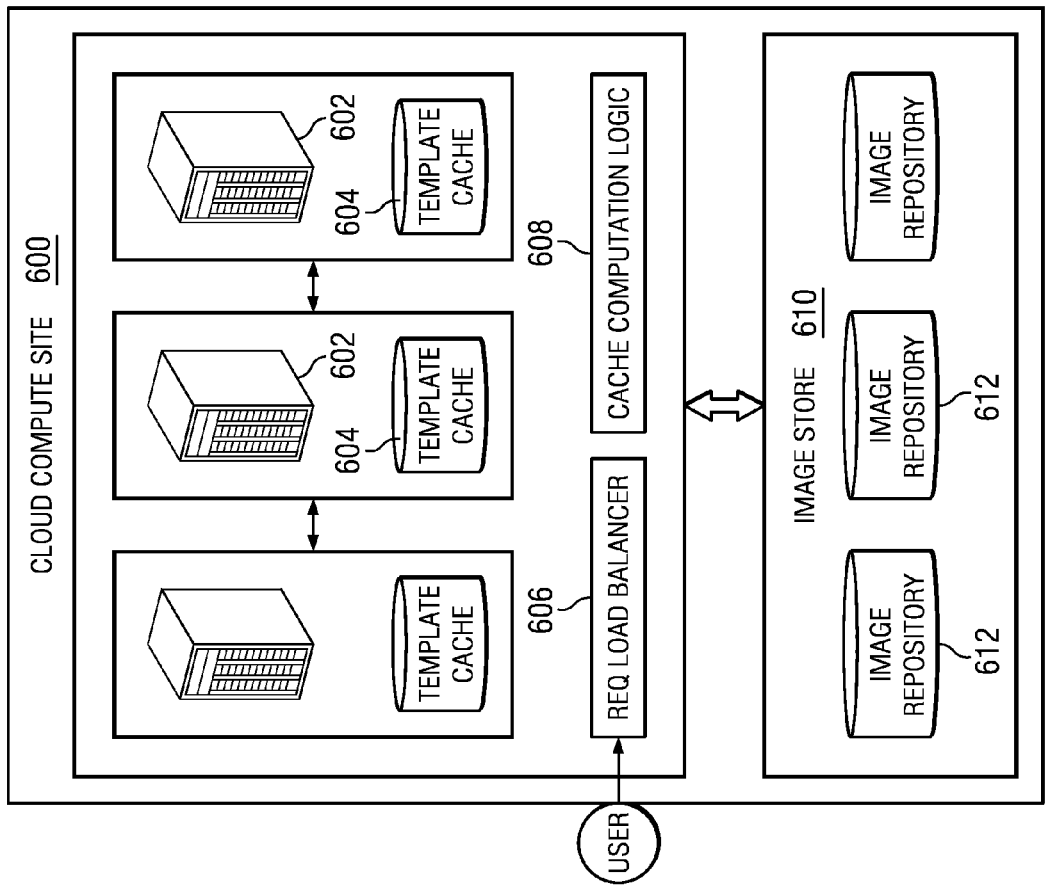
FIG. 6 illustrates a multi-tier distributed cache architecture implemented across a pair of cloud compute sites that are separated from one another geographically.
Figure 6:
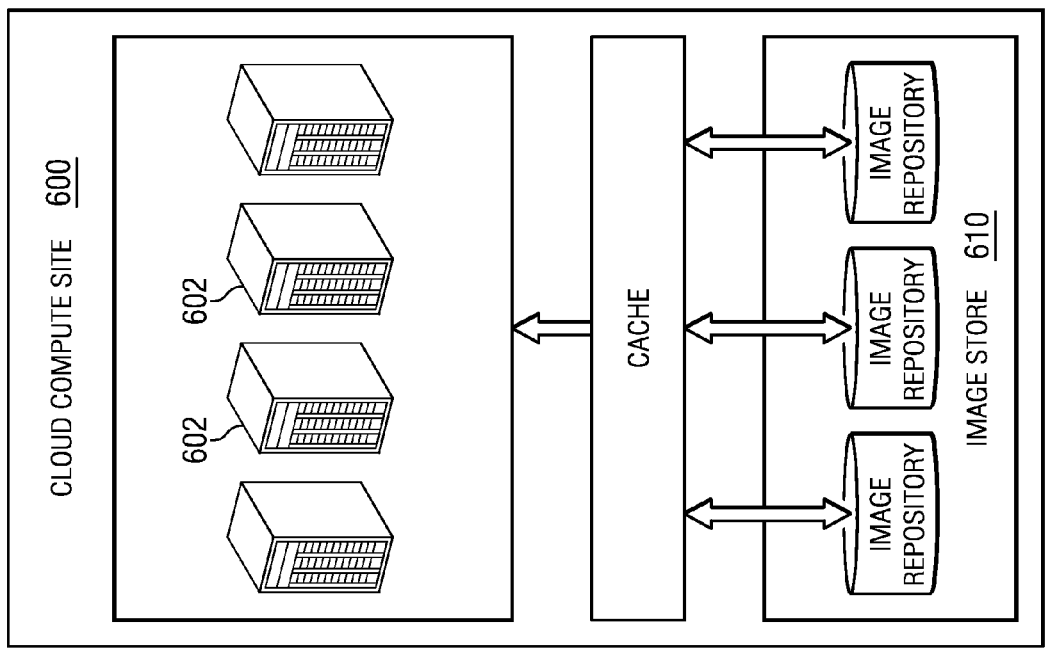

Preferably, the routine for VA service request processing using patch-based caching shown in FIG. 5 is implemented at each of one or more hosting locations (or, more generally, nodes). A set (i.e., two or more) of such hosting locations may be used to collectively form a "distributed" cache that caches frequently-requested machine images and patch files. A representative architecture for a distributed cache to store the image templates and their patches is shown in FIG. 6. In this architecture, which is merely representative, there are multiple cloud compute sites (or "cloud delivery locations") 600, each of which supports a plurality of compute hosts 602. The locations typically are geographically separate from one another, although this is not required. According to this disclosure, the image templates and the patch files are stored in one or more template caches 604. When co-located as shown in the example, the template caches are peers to one another, or each a so-called "peer cache." User requests directed to a particular cloud compute site 600 may be load balanced using a request load balancer 606, and cache computation logic 608 (as will described in more detail below) is used to populate the local caches intelligently. In addition to the distributed caching components, the system illustrated includes one or more data stores 610, where each of the data stores includes one or more image repositories 612. Each image repository 612 may be associated with a particular supplier or vendor. In operation of the distributed caching technique, a delivery location 600 may service a VA (or VM) provisioning request locally (if it can do so), or (as necessary) contact a repository to obtain the resources required. The distributed cache infrastructure illustrated is provided to cache frequently-requested machine images and files. Preferably, and as described in the process flow in FIG. 5, the distributed cache implements a n-tier design, where (in response to a request for the image template and/or patch) the local template is searched, then (as needed) a peer cache is searched, and, thereafter, the image repository is accessed. One or more additional intermediary tiers may be implemented depending on the number of image templates and patches, their size, and the like.

Preferably, the caching components shown in FIG. 6 are implemented as part of an existing cloud compute site infrastructure. In the alternative, dedicated hardware, storage and software resources may be allocated for this purpose. The overall size of the distributed cache may be varied as desired, and typically it is proportional to a number of nodes in the cloud setup. By using the distributed cache, requests may be handled with little or no appreciable network delay.

Figure 7:
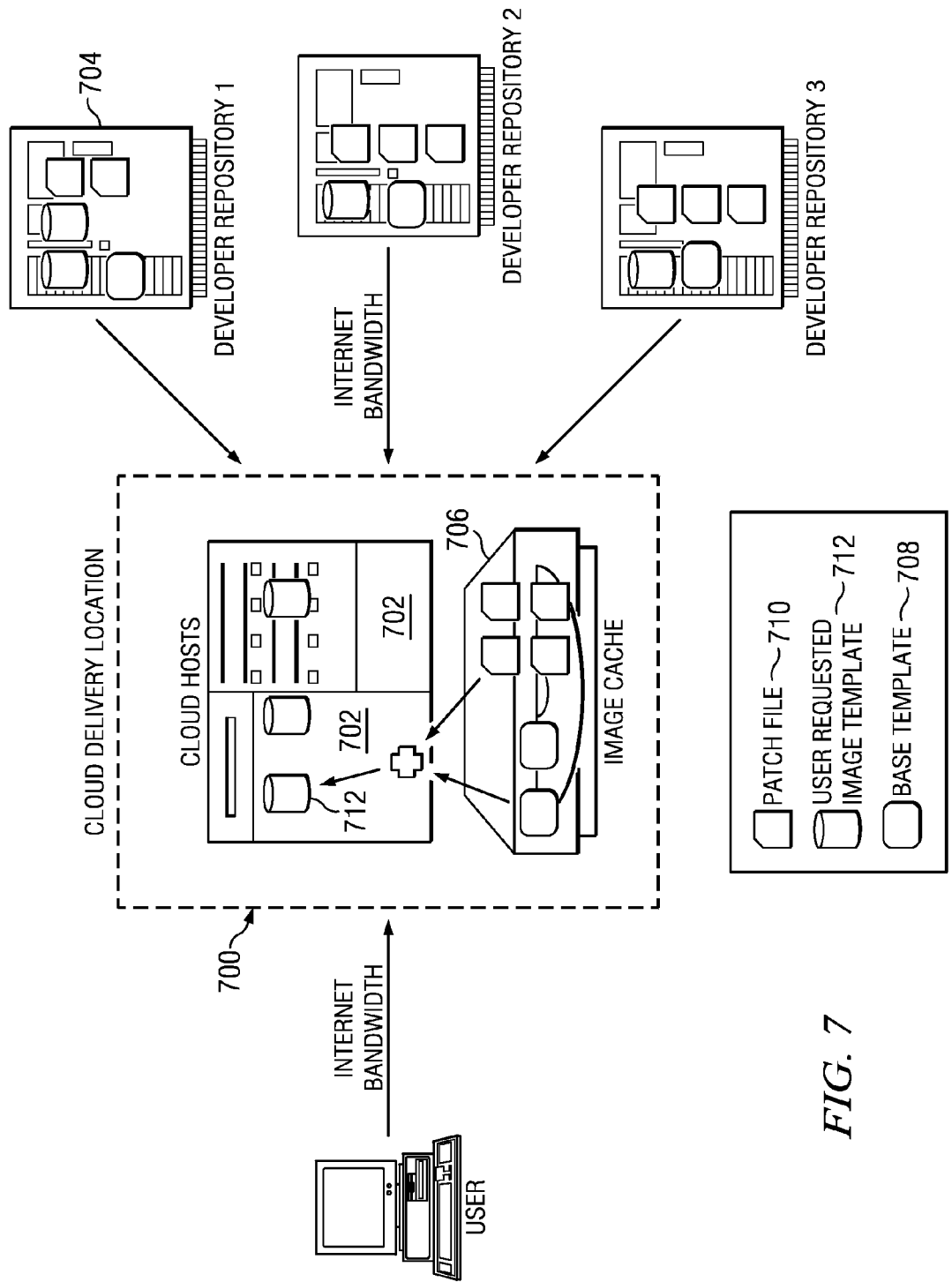
FIG. 7 illustrates a cloud delivery location hosting virtual servers and that implements that technique for minimizing latency in serving requests through differential template caching according to this disclosure.

FIG. 7 illustrates a particular cloud delivery location 700 hosting virtual servers 702 connectable to vendor repository 704 sites over the Internet. In this scenario, each of one or more vendors maintains its own globally addressable repository 704, and the cloud hosting cent maintains an index to the repository to fetch a file when required. In FIG. 7, different vendors maintain individual image repositories, although this is not a requirement. In response to a request from a user to provision a VA (or VM), the delivery location attempts to service the request from its local image cache 706 in the manner previously described. To that end, the image cache 706 caches base templates 708, as well as patch files 710, in the manner previously described. Then, if the user request can be serviced by generating a user-requested image template 712 (the target), e.g., by patching the base template 708 using a patch file 710, the target is generated and instantiated on a cloud host. If necessary, however, a host may contact a repository to service the request.

Figure 8:
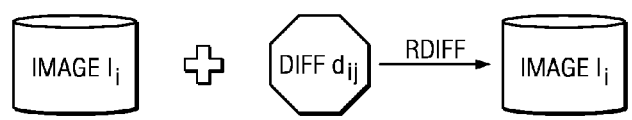
FIG. 8 illustrates how a patch is applied to a base template image to generate a target template image.

FIG. 8 illustrates how a target image $I_j$ is generated by applying a patch (Diff $d_{ij}$) to a base template image $I_i$. In one embodiment, the patch file is generated by applying a differencing algorithm RDIFF to the target image and the base template image. Any other differencing technique may be used. Moreover, it is not required that a differencing algorithm or method be applied to generate a patch file, however, as the patch may be known in advance or by easily determined by virtue of the characteristics of a particular VA. Thus, for example, and with reference again to FIG. 4, the particular base template image may be DB2 on Linux, in which case (given template image 406 as the target) the patch file is just an instance of Microsoft Office.

As one of ordinary skill in the art will appreciate, the approach (patching a base template to generate a target template, preferably on-demand) trades off patch generation time for the more costly and time-consuming technique of caching large templates and delivering them in response to provisioning requests. The patch generation process takes time on the order of a few minutes (or even less), and it may be performed off-line. Time to patch typically is proportional to the size of the patch, and the described approach takes advantage of patch-based caching to obviate caching and delivery of large image templates. A template missing in the local cache can be generated if any cached template can be patched with a cached patch file, thereby saving the transfer time from the repository (or elsewhere) at the cost of relatively small patching time.

Cache Population

The templates and patches to cache are computed at periodic intervals. In one approach, the request arrival history for the templates is used to compute the relative future importance of each template. Different mechanism, e.g., most-popular templates, or most-recently used templates, can then be used to generate a template ordering. Thus, for example, given a set of templates ordered by likelihood of being requested, and given a fixed cache space, a caching scheme may start by caching the most important templates until the cache space is completely utilized. Now, if a percentage (e.g., 50%) of the cache space is used to store templates with the remaining portion used to store patches, the templates are once again stored based on order of importance, but now the routine also determines whether a given template in the order can be generated by patching any of the existing stored templates; in such case, the routine then uses some of the available patch storage to store the patch instead of the given template. Similarly, patches are stored for the other templates, until the cache space runs out.

The above scheme, wherein the cache space is apportioned proportionally, can be significantly optimized such that the distributed cache is populated in a much more intelligent manner.

In particular, when the template cache is "distributed" and thus located across multiple caches (either within a particular compute facility or even across multiple locations), it is desirable to provide additional techniques to determine an optimal selection of patches and templates to be stored in each local cache, to thereby reduce the average request service time by minimizing the number of file transfers (e.g., from repository to compute hosts, from other caches to compute hosts, and the like). To this end, a differential template caching algorithm, referred to herein for convenience as DiffCache (and described in more detail below), provides this "intelligent" population of the cache. Generally, and as will be described, the algorithm computes an optimal selection of templates and patches based on one or more factors, such as the frequency of requests for specific templates, the rate of requests for different images, the size of the images and the patches, the patching time, available bandwidth between an image repository and the cloud delivery location (at which the provisioning request is received), bandwidth from one peer node to another, and the like.

Figure 9:
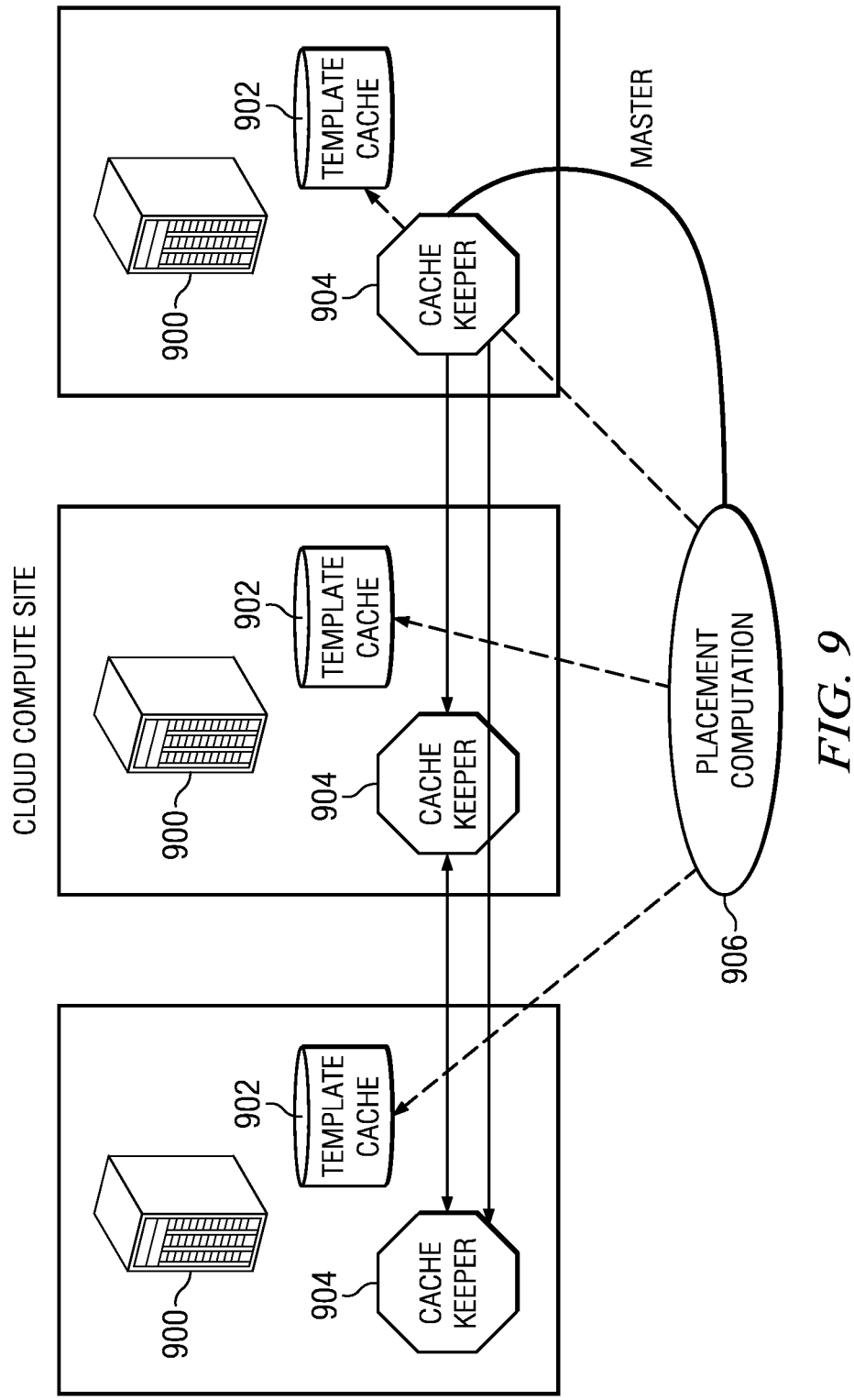
FIG. 9 illustrates a centrally-managed distributed caching architecture for a particular cloud compute site according to another aspect of this disclosure.

As illustrated in FIG. 9, the intelligent cache population technique may be implemented across the caches within a particular cloud delivery location using a centrally-managed placement computation. In this embodiment, each compute host 900 in the cloud delivery location supports its own template cache 902, and each host executes a cache keeper process 904. Each cache keeper process is implemented in software, as a set of computer program instructions executed by one or more hardware processors. The template caches 902 are in communication with one another, e.g., over a local network. Collectively, the template caches cooperative with one another and thus comprise a distributed, cooperative cache. The cache keeper process 904 executing on a compute host manages its associated template cache 902 and also communicates with other cache keeper processes. Preferably, a particular cache keeper process acts as a master cache keeper to decide on the placement strategy and, in particular, by executing the placement computation 906. Without limitation, the DiffCache algorithm may be used as the placement computation, and that computation preferably is implemented in software executed by one or more processing entities. Further, any known algorithm may be used by the processes 904 to select a keeper that acts as the master. A representative algorithm is a leader election algorithm. Using the cache keeper processes and known communication methods (such as ICP, Spread, or the like), each cache knows the contents of the other caches, and a cache keeper process at a particular node can communicate with a cache keeper process at one or more other hosts to get what it may require to service a request. A template cache 902 may change its composition; when it does, the associated cache keeper process broadcasts those changes to the other caches so that all of the caches continue to have a global view of the cache contents as a whole (at least for the site itself). A cache typically changes its composition when a certain configurable percentages of cache misses occur. A cache miss is defined as an event when the requested image is not found in the local cache. Preferably, cache updates occur asynchronously.

In an alternative embodiment (not shown), instead of using a master cache keeper and a centralized placement computation 906, the cache keeper process at each node decides what resides in its associated template cache. This approach may be used if there is a requirement for more than one manager, or if privacy and/or security concerns are at issue.

Although not to be limiting, the above-illustrated approach may be implemented in association with a cloud compute facility having a set of hosts. In one embodiment, a portion of the disk space of each host is declared as a cache (the template cache), with the cache having a minimum and maximum bound defining the available cache space. The cache keeper process executes as a software process and coordinates the activities of serving the requested image and communicating with the other cache keepers (or, as necessary) external sources such as the repository. The cache keeper is notified of changes in the composition of the overall cache from other nodes and, in particular, the cache keepers running on such other nodes. After receiving an update from another host, the cache keeper updates its own estimates of the contents of the other participating caches. On receiving a request from another cache keeper for an image or a patch, the cache keeper that receives the request searches locally; if the requested artifact exists, the cache keeper responds by sending it back to the requestor. Otherwise, the cache keeper may route the request to another cache keeper to serve the request. At regular intervals, the master cache keeper calls the cache placement computation for computing a new composition of the local cache.

When a cache keeper needs to request a file from the other caches, it may issue a request to all of the other caches and wait for a response. A known cache protocol for implementing this function is the inter-cache protocol (ICP). Any other cache that has the file requested may send an acknowledgement and enter a lock; the lock prevents the acknowledging cache from changing its cache composition. Once the acknowledgement are received, the requesting cache asks one of the acknowledging caches to send file and instructs the other acknowledging caches to remove their locks.

By way of additional background, the cache population problem can be formulated as a linear programming problem, wherein the goal is to minimize the cost of serving the request for the image, where cost may be either traffic flow or serving time. The cost can be incurred from several scenarios, such as described above with respect to FIG. 5. Thus, if the image is cached in local cache, the cost is just the time and expense necessary to clone the image and serve it to the user. If the image is not cached but some corresponding patch is cached, the cost is the time and expense necessary to patch the image and serve the result to the user. If the corresponding patch is not cached, however, there is an additional cache incurred to obtain it from a peer cache, and then to patch it with the base template and serve the result to the user. In this latter case, the total cost includes the time necessary to fetch the patch and to apply it to generate the target image template. Still another scenario is where it is required to obtain the complete image from some peer cache and serve it to the user; the cost in this scenario it that needed to get the image from the peer cache. Additional costs are incurred when the base and/or patch must be fetched from a farther-away caches or the repository itself. Preferably, the algorithm minimizes cost while also taking into consideration a cache size constraint.

One of the primary notions used in the formulation is that an image template requested at a node can be generated using another template present on a different node, and a patch on another node. For convenience, this notion can be represented by the following notation: $I_j@H_1=I_i@H_2 \text{ patch}_{ij}@H_3$ where template $I_j$ is requested at host H1 and is generated using template $I_i$ fetched from host $H_2$, and patch $\text{patch}_{ij}$ retrieved from host $H_3$. In the event the necessary files are not cached, the repository is or may be contacted for retrieving the appropriate files.

Let there be N different types of templates that can be requested, and K represents the number of hosts. Of these hosts, the index 0 is used to represent the repository host, and the values (1, . . . K) denote the hosts in the cloud hosting site. The indices i and j indicate templates, and it varies from (1, . . . N). Indices p, q denote the index of the hosts hosting the base template and patch, respectively, and vary from (0, . . . K). The index r also is used as a host index to denote the host where a new template is requested and, therefore, it varies from (1, . . . K). Other notations are described in the Table shown in FIG. 10.

The specific problem is to derive a set of base templates and patches, and to determine their placements on the available hosts. Typically, there are several constraints that should be satisfied to define the problem precisely. These constraints are now described.

Unique-Solution Constraint

For a request for a template at a host, there are multiple ways to make the template available. Typically, one way may be determined to ensure the minimal cost. To that end, a decision variable $S_{ijpqr}$ is used to indicate the method of constructing a template at a specific host. The constraint on this decision variable is referred to herein as a unique-solution constraint, and it can be expressed by the following Equation (1):

$$\sum_i \sum_p \sum_q S_{ijpqr} = 1, \forall j, r;$$

The number of solutions (i.e., the number of 1's in $S_{ijpqr}$) for a template $I_j$ requested at host $H_r$ is 1.

Usage Constraint

To generate a template $I_j$ at host $H_r$, one can use template $I_i$ at host $H_q$ and $\text{patch}_{ij}$ at $H_p$. If there are several templates in the setup, which uses $I_i$ from host $H_q$ and $\text{patch}_{ij}$ from $H_p$, then a usage count of these entities must be accounted for such that they are not purged mistakenly when are active users of them. A constraint that encodes the idea of usage count is defined by accounting for the usage of a template and a patch when a lookup decision is finalized. This constraint is referred to herein as Usage constraint, and it is expressed by Equations (2) and (3) below:

$$S_{iiqqq} = \frac{{}_j{}_p{}_q S_{ijpqr}}{N*(K+1)*K} \quad \forall\ i, q$$

$$patch_{ijp} = \frac{{}_q{}_r S_{ijpqr}}{(K+1)*K} \quad \forall\ i, j, q$$

Note that $S_{iiqqq}$ denotes that template $I_i$ on $H_q$; the notation $patch_{ijp}$ denotes that the patch to generate template j from template i is on host $H_p$. The left-hand side of Equation (2) denotes whether the template $I_i$ should be placed on host $H_q$. Note that the template will be cached at host $H_q$ (i.e., the value of the variable $S_{iiqqq}$ will be 1) if it is marked to be used at least once. The three summations on the right-hand side determine if template $I_i$ at host $H_q$ is used for any request for template $I_j$ at host $H_r$. Because the value of the variable $S_{iiqqq}$ should be either 1 or 0, the total count is divided by the maximum number of times a cached entity can be used (which is given by the product of number of hosts and number of templates). Thus, the expression is bound within 0 and 1. The ceiling of this expression satisfies the integrality constraint of $S_{iiqqq}$. Equation (3) can be understood similarly, where $patch_{ijp}$ is an integer in [0, 1].

Capacity Constraint

Capacity constraint ensures that the available space for cache on each node is not exceeded after placing the templates and patches. There can be multiple templates and patches cached on each node, and this constraint ensures that the total space used is less than the cache space. Preferably, capacity constraint is expressed as Equation (4):

$$_j S_{jjrrr} * size_j +\ _i\ _j patch_{ijr} * size_{ij} \leq C_r \quad \forall\ r;$$

Equation (4) finds the cache usage at host Hr. The space is consumed by base template files and patch files. As with Equations (2) and (3), whether base template Ij and patchijr are getting used is determined by looking at Sijrrr and patchijr, respectively. If they are getting used, it implies that they are cached at host Hr. The equation sums up the sizes of all templates and patches on host Hr to compute the total space consumed on Hr, and this total space should be less than Hr's capacity for each Hr.

Cost Function

The cost of servicing a request for a template $I_j$ on a host $H_r$ is dependent on the availability of the templates as per the placements made in a previous round of cache computation. As was explained in the process flow in FIG. 5, there are several ways to register a cache hit: (i) template $I_j$ is available on $H_r$; (ii) template $I_j$ is available on a peer node; (iii) template $I_j$ can be generated using $I_i$ and $patch_{ij}$, and $I_i$ and $patch_{ij}$ are available on $H_r$ or any of its peer nodes. If all these cases fail, then $patch_{ij}$ may need to be fetched from the repository (when the base template $I_i$ is available in one of the peer nodes), or template $I_j$ may need to be fetched from the repository.

Based on how a request will be serviced, and given a cache composition, the latency for servicing a request, or the total bytes transferred, can be computed. Minimization of either of these two costs can be achieved by the same cache composition. In particular, when a request is handled locally on a server, the total time spent is in copying the image file from the local cache, in addition to patching, if patching is required. Assume the transfer time is LocalTx. If a peer server is contacted, then the transfer is over the local area network (typically), and the transfer rate is PeerTx. When the repository is involved, then the transfer rate is RepoTx. Note that, typically, LocalTx>PeerTx>>RepoTx. To compute the latency of servicing a request, the size of the templates and patches used, and the transfer rates, must be known. To compute the bytes transferred, only the size data is needed. To generate the cost, a cost matrix stores the value of servicing a request for a template at a host. As described earlier, the decision variable $S_{ijpqr}$ denotes a specific combination to construct a requested template at a node. Therefore, given the cost of the construction, as stored in the matrix, the total cost of servicing all the requests is easily computed. Further, if the arrival history is available, the request load for each template on a node is computed and denoted by $f_{jr}$. Finally, an objective function that minimizes the total cost of servicing all the predicted requests in then given by Equation (5) below:

$$\min{}_{j=1}^{N}\ {}_{r=1}^{K}\ {}_{i=0}^{N}\ {}_{p=0}^{K}\ {}_{q=0}^{K} f_{jr} * s_{ijpqr} * \gamma_{ijpqr}$$

Equation (5) finds the total cost of servicing each request $I_j$ at host $H_r$. This computes an aggregate cost because it also takes into consideration frequency of templates being requested on a host, namely, $f_{jr}$. The variable $S_{ijpqr}$ encodes the solution to be used to service a request for template $I_j$ at $H_r$ and variable $_{ijprq}$ gives the cost corresponding to a solution.

The above problem formulation thus provides an integer linear program that, once solved, provides an optimal placement of the templates and the patches to minimize the total cost of servicing requests.

The following describes DiffCache, an algorithm for pre-filling the cache with base templates and patches. The problem is an NP-hard problem. A heuristic for solving the problem, i.e., for computing the best composition of the cache given multiple input parameters (e.g., frequency of request arrival for each template on a node, cost of servicing a request on a node where the sizes of templates and patches are known, and so on) is now described.

Preferably, the algorithm computes the placements over multiple rounds. FIG. 11A-11B illustrates an embodiment of the DiffCache algorithm. In each round, the requirement is to select a template on a host, plus patches along with their hosts. Each round preferably runs in two steps. In a first step, a template is placed on a node while satisfying the capacity constraint (FIG. 11B, line 16). Given this placement, the algorithm searches for the patches across all nodes so as to minimize the total cost (PickPatches at FIG. 11B, line 25). The algorithm ensures that all combinations of templates and nodes are considered before finalizing a round (PickImageAndPatches at FIG. 11B, line 12). At each round, a new template is picked and the steps are repeated until the cache space is exhausted. At the end of each round, several data structures (UpdateDataStructures) are updated. In particular, the LookUpTable is a hashtable that returns the templates and patches, along with the hosts (which may be the repository), from which to fetch the respective items. The key to the hashtable is the template id and the host on which it is required. At each round, when new templates and patches are added to the cache, the lookup can undergo a change. Use of the hashtable ensures that there is exactly one solution to construct a template on a host. In an alternative embodiment with a large number of templates, a database may be used to store the solutions to speed up the search. As described previously, for each template on a host, and for a patch on a host, the usage count (Usage-Count) is maintained as the lookup entries are updated. This ensures that a patch or a template is not removed from the cache assuming it is not in use. Further, after each round, the available space on each node for caching (Available-Space) is updated based on the new placements.

The subject matter described herein has significant advantages over the prior art. In general, the use of caching as described improves (by reducing) provisioning time and cost. The network cost to transfer an image from a centralized cache to a hosting node is substantially reduced by caching the requested image in the cache at the hosting node. By leveraging a differencing technique (e.g., RDIFF), a requested image template is created from a cached template in a lesser amount of time than doing the same from a centralized cache at the hosting node. The approach enables the cloud service provider to maintain a larger number of redundant copies of more popularly-requested image templates. The described approach provides a way to reduce the network usage of the cloud setup while still maintaining cache efficiencies. The technique provides a highly-reliable, highly-scalable, and highly-available approach to delivering virtual appliances. Preferably, the most common parts of VA are identified and cached as a base image so that a target VA can be easily and reliably constructed on-the-fly using the base and a pre-computed difference image (or patch). Patch-based caching coupled with intelligent population of the cache in the manner described provides significant improvement in service request latency as compared with caching only template files.

The technique is further advantageous as it exploits the fact that image templates often exhibit a high degree of commonality. It is known to exploit this characteristic and optimize storage requirements by storing only common blocks across templates. The subject technique takes this approach a step further to exploit commonality among templates while caching. As has been described, a patch file between two similar templates typically is small in size. If the template and the patch file are in cache, then a new template can be generated by using the in-cache template and patch. This approach not only ensures that the request is serviced from cache, it also saves in terms of cache space requirement. In particular, because patch files are small in size, the provider can effectively cache more templates by just storing a few templates and multiple patches. Then, given the request pattern for templates and the available cache space, it is possible to compute an optimal cache composition that minimizes the number of requests required to contact the repository for servicing. The described DiffCache algorithm populates the cache with patch and template files that minimizes network traffic and leads to significant gains in reducing service time when compared to standard caching techniques of merely storing template files.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The virtual machine planning framework or components thereof may be hosted in the cloud.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the virtual machine placement framework can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the framework components are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

Further, the framework functionality provided herein may be implemented as an adjunct or extension to an existing cloud compute management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The technique described herein may be used to provision any virtual "resource" in a cloud compute environment. A "resource" as used herein typically is a virtual appliance, but this is not a limitation. The "resource" may be a virtual machine, a hypervisor resource, or any other machine, device, data store, process or program.

A "patch" as described herein should be broadly construed to refer to any supplement, addition or extension that is appended to or otherwise associated with an image template to create the desired virtual resource.

Having described our invention, what we now claim is as follows:

1. A method of provisioning in a cloud compute environment having a set of cloud hosts, comprising:
   forming a distributed, cooperative cache throughout the set of cloud hosts;
   coordinating caching activity throughout the distributed, cooperative cache; and
   attempting to service requests to provision virtual resources from information stored in the distributed, cooperative cache;
   wherein the distributed, cooperative cache is formed by:
   declaring a portion of data store associated with a cloud host as a cache;
   storing template images and patches in the cache; and
   having each cache update at least one or more other caches with information about contents of its cache.

2. The method as described in claim 1, wherein:
   the distributed, cooperative cache comprises a plurality of caches; and
   the caching activity is coordinated by receiving at one of the caches a request for a template image or a patch, wherein:
   if the template image or patch is present at the cache that receives the request, responding to the request; and
   if the template image or path is not present at the cache that receives the request, routing the request to another of the caches in the distributed, cooperative cache.

3. The method as described in claim 1, wherein:
   the distributed, cooperative cache comprises a plurality of caches; and
   the caching activity is coordinated by a selected one of the caches acting as a master.

4. The method as described in claim 1, further including periodically computing a composition of the distributed, cooperative cache.

5. The method as described in claim 4, further including populating template images and patches in caches that form the distributed, cooperative cache based on the composition.

6. The method as described in claim 5, wherein the template images and patches are populated in the caches according to a cost function that minimizes a total cost of responding to service requests.

7. Apparatus, comprising:
   a processor;
   computer memory holding computer program instructions that when executed by the processor perform a method of provisioning in a cloud compute environment, the method comprising:
   forming a distributed, cooperative cache throughout a set of cloud hosts;
   coordinating caching activity throughout the distributed, cooperative cache; and
   attempting to service requests to provision virtual resources from information stored in the distributed, cooperative cache;
   wherein the distributed, cooperative is formed by:
   declaring a portion of a data store associated with a cloud host as a cache;
   storing template images and patches in the cache; and
   having each cache update at least one or more other caches with information about contents of its cache.

8. The apparatus as described in claim 7, wherein:
   the distributed, cooperative cache comprises a plurality of caches; and
   the caching activity is coordinated by receiving at one of the caches a request for a template image or a patch, wherein:
   if the template image or patch is present at the cache that receives the request, responding to the request; and
   if the template image or path is not present at the cache that receives the request, routing the request to another of the caches in the distributed, cooperative cache.

9. The apparatus as described in claim 7, wherein:
   the distributed, cooperative cache comprises a plurality of caches; and
   the caching activity is coordinated by a selected one of the caches acting as a master.

10. The apparatus as described in claim 7, wherein the method further includes periodically computing a composition of the distributed, cooperative cache.

11. The apparatus as described in claim 10, wherein the method further includes populating template images and patches in caches that form the distributed, cooperative cache based on the composition.

12. The apparatus as described in claim 11, wherein the template images and patches are populated in the caches according to a cost function that minimizes a total cost of responding to service requests.

13. A computer program product in a non-transitory computer readable medium for use in a data processing system, the computer program product holding computer program instructions which, when executed by the data processing system, perform a method of provisioning in a cloud compute, the method comprising:
   forming a distributed, cooperative cache throughout a set of cloud hosts;
   coordinating caching activity throughout the distributed, cooperative cache; and
   attempting to service requests to provision virtual resources from information stored in the distributed, cooperative cache;
   wherein the distributed, cooperative cache is formed by:
   declaring a portion of a data store associated with a cloud host as a cache;

storing template images and patches in the cache; and having each cache update at least one or more other caches with information about contents of its cache.

14. The computer program product as described in claim 13, wherein the caching activity is coordinated by:

receiving at one of the caches a request for a template or a patch;

if the template image or patch is present at the cache that receives the request, responding to the request; and if the template image or path is not present at the cache that receives the request, routing the request to another of the caches in the distributed, cooperative cache.

15. The computer program product as described in claim 13, wherein:

the distributed, cooperative cache comprises a plurality of caches; and the caching activity is coordinated by a selected one of the caches acting as a master.

16. The computer program product as described in claim 13, wherein, the method further includes periodically computing a composition of the distributed, cooperative cache.

17. The computer program product as described in claim 16, wherein the method further includes populating template images and patches in caches that form the distributed, cooperative cache based on the composition.

18. The computer program product as described in claim 17, wherein the template images and patches are populated in the caches according to a cost function that minimizes a total cost of responding to service requests.

* * * * *